US010516345B2

(12) United States Patent
Kunomura et al.

(10) Patent No.: US 10,516,345 B2
(45) Date of Patent: Dec. 24, 2019

(54) POWER CONVERSION CONTROLLER FOR ELECTRIC TRAIN

(71) Applicant: CENTRAL JAPAN RAILWAY COMPANY, Nagoya-shi, Aichi (JP)

(72) Inventors: Ken Kunomura, Nagoya (JP); Kenji Sato, Nagoya (JP); Akihiro Koyanagi, Nagoya (JP)

(73) Assignee: CENTRAL JAPAN RAILWAY COMPANY, Nagoya Shi, Aichi (JP)

( * ) Notice: Subject to any disclaimer, the term of this patent is extended or adjusted under 35 U.S.C. 154(b) by 0 days.

(21) Appl. No.: 16/090,988

(22) PCT Filed: Mar. 31, 2017

(86) PCT No.: PCT/JP2017/013713
§ 371 (c)(1),
(2) Date: Oct. 3, 2018

(87) PCT Pub. No.: WO2017/175684
PCT Pub. Date: Oct. 12, 2017

(65) Prior Publication Data
US 2019/0135117 A1 May 9, 2019

(30) Foreign Application Priority Data

Apr. 4, 2016 (JP) .................................. 2016-075252

(51) Int. Cl.
*H02M 7/44* (2006.01)
*H02M 7/797* (2006.01)
(Continued)

(52) U.S. Cl.
CPC ................ *H02M 7/44* (2013.01); *B60L 9/24* (2013.01); *B60L 15/007* (2013.01); *H02M 1/00* (2013.01);
(Continued)

(58) Field of Classification Search
CPC .. H02M 1/32; H02M 7/44; H02M 2001/0025; B60L 15/007; B60L 9/24
See application file for complete search history.

(56) References Cited

U.S. PATENT DOCUMENTS

| 5,790,396 A * | 8/1998 | Miyazaki | H02M 7/487 363/96 |
| 6,407,536 B1 * | 6/2002 | Ogusa | G05F 1/70 323/207 |

(Continued)

FOREIGN PATENT DOCUMENTS

| JP | H6-303780 | 10/1994 |
| JP | 2000-156902 | 6/2000 |

(Continued)

OTHER PUBLICATIONS

English translation of International Search Report from corresponding PCT Appln. No. PCT/JP2017/013713, dated Jun. 27, 2017.
(Continued)

*Primary Examiner* — Yusef A Ahmed
(74) *Attorney, Agent, or Firm* — Grossman, Tucker, Perreault & Pfleger, PLLC (57) ABSTRACT

A power conversion controller for electric train in one aspect of the present disclosure includes an active current command value generator, an overhead line voltage detector, an initial value calculator, an adjustment value calculator, an upper limit value setter, and an output limiter. The output limiter outputs a reactive current command adjustment value calculated by the adjustment value calculator as a reactive current command value when the reactive current command adjustment value is equal to or lower than an upper limit value set by the upper limit value setter, and outputs the upper limit value as the reactive current command value (Continued)

when the reactive current command adjustment value exceeds the upper limit value.

10 Claims, 5 Drawing Sheets

(51) Int. Cl.
    *B60L 9/24*                  (2006.01)
    *H02M 1/00*              (2006.01)
    *B60L 15/00*             (2006.01)
    *H02M 1/32*               (2007.01)
    *H02P 27/08*             (2006.01)

(52) U.S. Cl.
    CPC ......... *H02M 7/797* (2013.01); *B60L 2200/26* (2013.01); *B60L 2200/30* (2013.01); *H02M 1/32* (2013.01); *H02M 2001/0025* (2013.01); *H02P 27/08* (2013.01); *Y02E 40/30* (2013.01)

(56) References Cited

U.S. PATENT DOCUMENTS

| | | | | |
|---|---|---|---|---|
| 6,573,690 | B2* | 6/2003 | Ogusa | H02J 3/1842 323/207 |
| 9,654,031 | B2* | 5/2017 | Sakanoue | B60L 3/0061 |
| 2001/0022736 | A1* | 9/2001 | Suzuki | H02M 1/4233 363/69 |
| 2005/0077853 | A1* | 4/2005 | Nagakura | H02M 7/48 318/432 |
| 2007/0121354 | A1* | 5/2007 | Jones | H02M 5/4585 363/47 |
| 2009/0230903 | A1* | 9/2009 | Yamamoto | H02M 7/53875 318/400.3 |
| 2010/0226157 | A1* | 9/2010 | Ohnishi | H02M 5/4585 363/131 |
| 2011/0057444 | A1* | 3/2011 | Dai | H02J 3/386 290/44 |
| 2013/0009482 | A1* | 1/2013 | Okui | H02J 3/24 307/66 |
| 2013/0058144 | A1* | 3/2013 | Hiramatsu | H02M 1/12 363/131 |
| 2013/0121034 | A1* | 5/2013 | Takegami | H02M 3/33584 363/17 |
| 2013/0215652 | A1* | 8/2013 | Komatsu | H02J 3/386 363/37 |
| 2013/0279213 | A1* | 10/2013 | Saeki | H02M 7/68 363/37 |
| 2013/0279214 | A1* | 10/2013 | Takase | H02M 7/68 363/37 |
| 2014/0307494 | A1* | 10/2014 | Wu | H02M 7/48 363/97 |
| 2015/0002066 | A1* | 1/2015 | Oda | H02M 5/4585 318/500 |
| 2015/0188478 | A1* | 7/2015 | Saeki | H02P 25/02 318/812 |
| 2015/0280612 | A1* | 10/2015 | Ide | H02M 7/53871 363/98 |
| 2016/0226425 | A1* | 8/2016 | Kawashima | H02P 27/04 |
| 2017/0126142 | A1* | 5/2017 | Toujinbara | H02M 7/53875 |
| 2018/0013364 | A1* | 1/2018 | Itoh | H02P 9/102 |
| 2018/0167004 | A1* | 6/2018 | Suzuki | H02P 21/05 |
| 2018/0366977 | A1* | 12/2018 | Ganireddy | H02J 11/00 |

FOREIGN PATENT DOCUMENTS

| | | |
|---|---|---|
| JP | 2005-304156 | 10/2005 |
| JP | 4568111 | 10/2010 |

OTHER PUBLICATIONS

English translation of Written Opinion from corresponding PCT Appln. No. PCT/JP2017/013713, dated Jun. 27, 2017.

* cited by examiner

FIG. 5

POWER CONVERSION CONTROLLER FOR ELECTRIC TRAIN

CROSS-REFERENCE TO RELATED APPLICATION

This international application claims the benefit of Japanese Patent Application No. 2016-075252 filed Apr. 4, 2016 in the Japan Patent Office, and the entire disclosure of Japanese Patent Application No. 2016-075252 is incorporated herein by reference.

TECHNICAL FIELD

The present disclosure relates to a technique for controlling a power converter to be mounted on an electric train configured so that a motor for traveling is driven by alternating-current (AC) power collected from an overhead line.

BACKGROUND ART

An electric train configured to collect AC power from an overhead line via a pantograph to travel is generally provided with a power converter that converts the AC power collected from the overhead line as appropriate and supplies the resulting power to a motor for traveling. In a method for controlling this type of power converter, it is common to control the device so that a power factor of the AC power inputted from the pantograph becomes unity, that is, only active power is consumed in the electric train, from a viewpoint of weight reduction and downsizing of the device.

However, controlling the power converter so that the power factor becomes unity as described above may cause the following problem. That is, along with the consumption of active power by train traveling, an overhead line voltage decreases or fluctuates due to influence of an impedance of a power source side of a feeding circuit that supplies the AC power to the overhead line, an impedance of the feeding circuit and the like. Specifically, in an electric train, like the existing Shinkansen bullet train, for example, that is designed to consume a specified active power regardless of a value of an AC voltage received from the overhead line, electric current consumed by the electric train increases as an overhead line voltage decreases. Due to the influence, the overhead line voltage may further decrease, and, in some cases, a given propulsive force may not be obtained.

As a countermeasure against the above problem caused by unity power factor control in the electric train, there is a method of maintaining the overhead line voltage equal to or higher than a standard voltage by installing a var compensator or a fixed power factor output power converter in a feeding substation. However, this method requires significant cost and a large installation space for installation of each device.

In contrast, Patent Document 1 below discloses a technique of controlling a VVVF converter so as to generate leading reactive power without setting unity power factor during power running in the electric train.

Also, Patent Document 2 below discloses a power converter that suppresses voltage fluctuation of an AC system which supplies electric power to a vehicle on the AC system side. That is, Patent Document 2 discloses a technique of suppressing voltage fluctuation of the AC system by autonomously determining an active power consumption and a reactive power consumption based on an AC system voltage, and coupling to the AC system the power converter that simultaneously consume the determined active power and reactive power.

PRIOR ART DOCUMENTS

Patent Documents

Patent Document 1: Japanese Unexamined Patent Application Publication No. 2000-156902
Patent Document 2: Japanese Patent Publication No. 4568111

SUMMARY OF THE INVENTION

Problems to be Solved by the Invention

In principle, it is possible to maintain the overhead line voltage at an appropriate level by causing a power converter for electric train to consume the leading reactive power, as in the technique disclosed in Patent Document 1. However, in the technique disclosed in Patent Document 1, the leading reactive power required for maintaining the overhead line voltage is simply added to the active power consumed by the electric train and then consumed by the power converter for electric train.

Therefore, due to limitation of a rated current of the power converter for electric train, the active power required by the electric train is limited by the addition of a leading reactive current. As a result, there is a possibility that a desired propulsive force cannot be obtained. In addition, when a plurality of electric trains are present in the same feeding circuit, consumption of leading reactive power by a power converter of each electric train competes, which may cause the overhead line voltage to become unstable.

On the other hand, adoption itself of the technique disclosed in Patent Document 2 to the power converter in the electric train is possible, and it is thereby possible to suppress fluctuation of the overhead line voltage. However, in the technique disclosed in Patent Document 2, an active current command value is determined by a leading reactive current command value. That is, supply of the active current is determined depending on the leading reactive current command value. Therefore, the active current required to ensure the propulsive force of the electric train cannot be freely determined. That is, the active current of the electric train itself can no longer be freely determined in exchange for maintaining the overhead line voltage. It is possible that performance that an electric train should originally exhibit as an electric train is affected. Therefore, it is not possible to apply the technique of Patent Document 2 to a power converter for electric train.

In one aspect of the present disclosure, it is desirable that an overhead line voltage can be stably maintained at an appropriate level while active power required for an electric train is ensured.

Means for Solving the Problems

A power conversion controller for electric train in one aspect of the present disclosure is mounted on an electric train configured to receive AC power from an overhead line through which the AC power is supplied, and controls a power converter that converts the AC power inputted from the overhead line. The power converter is configured to receive an active current command value and a reactive current command value from the power conversion controller for electric train, and consume an active current corresponding to the active current command value and a leading reactive current corresponding to the reactive current command value.

The power conversion controller for electric train comprises an active current command value generator, an overhead line voltage detector, an initial value calculator, an adjustment value calculator, an upper limit value setter, and an output limiter.

The active current command value generator is configured to generate the active current command value corresponding to active power to be supplied to a load from the power converter.

The overhead line voltage detector is configured to detect an overhead line voltage received from the overhead line.

The initial value calculator is configured to calculate a reactive current command initial value which is an initial value of the reactive current command value for causing an overhead line voltage detection value to follow a voltage command value based on a difference between the voltage command value and the overhead line voltage detection value. The voltage command value is a target value of the overhead line voltage, and the overhead line voltage detection value is the overhead line voltage detected by the overhead line voltage detector.

The adjustment value calculator is configured to calculate a reactive current command adjustment value that is a value of a percentage of the reactive current command initial value calculated by the initial value calculator, the percentage corresponding to the active current command value generated by the active current command value generator.

The upper limit value setter is configured to set an upper limit value of the reactive current command value based on the active current command value generated by the active current command value generator so that the larger the active current command value is, the smaller the reactive current command value is.

The output limiter is configured to output the reactive current command adjustment value as the reactive current command value when the reactive current command adjustment value calculated by the adjustment value calculator is equal to or lower than the upper limit value set by the upper limit value setter, and to output the upper limit value as the reactive current command value when the reactive current command adjustment value exceeds the upper limit value.

In the power conversion controller for electric train configured as above, the active current command value is generated in accordance with active power to be supplied to a load, while the reactive current command value is determined in accordance with the active current command value. Particularly, the reactive current command initial value calculated based on the difference between the voltage command value and the overhead line voltage detection value is not outputted one hundred percent exactly as the reactive current command value, but is adjusted to a value of a percentage corresponding to the active current command value by the adjustment value calculator. That is, the reactive current command initial value is adjusted to an amount of 0 to 100% corresponding to the active current command value, and then outputted as the reactive current command adjustment value. The reactive current command initial value is adjusted such that the larger the active current command value is, the larger the ratio is, conversely, the smaller the active current command value is, the smaller the ratio is. That is, the reactive current command adjustment value is adjusted to an amount corresponding to active power required by the electric train.

Further, the upper limit value is set for the reactive current command adjustment value. When the reactive current command adjustment value is equal to or lower than the upper limit value, the reactive current command adjustment value is outputted without change as the reactive current command value. However, when the reactive current command adjustment value exceeds the upper limit value, the upper limit value is outputted as the reactive current command value. That is, priority is given to supply of the required active power to the load. The reactive current command value to be finally outputted is limited to the upper limit value at maximum.

Therefore, according to the power conversion controller for electric train configured as above, it is possible to stably maintain the overhead line voltage at an appropriate level while ensuring active power required for the electric train.

The electric train herein is a concept including not only a single vehicle but also a single train set of a plurality of coupled vehicles. Also, the power conversion by the power converter may be, for example, a conversion from AC power to AC power, or a conversion from AC power to direct-current (DC) power.

EXPLANATION OF REFERENCE NUMERALS

10 . . . main circuit system for electric train, 11 . . . pantograph, 12 . . . main transformer, 13 . . . converter, 14 . . . inverter, 15 . . . motor, 16 . . . converter voltage detector, 21, 50, 60, 70 . . . power conversion controller, 22 . . . PWM circuit, 26 . . . overhead line voltage detector, 27 . . . position detector, 31 . . . active current command value generator, 32 . . . voltage command value setter, 33 . . . adder, 34 . . . AC voltage control circuit, 35 . . . output power factor coefficient setter, 36 . . . multiplier, 37 . . . upper limit value setter, 38 . . . limiter circuit, 51 . . . switching circuit, 52 . . . switch controller, 61 . . . output multiplier, 62 . . . low voltage detection circuit, 100 . . . overhead line Mode for Carrying Out the Invention Hereinafter, an example embodiment of the present disclosure will be described with reference to the drawings.

[First Embodiment]

(1) Outline of Main Circuit System for Electric Train

Figure 1:
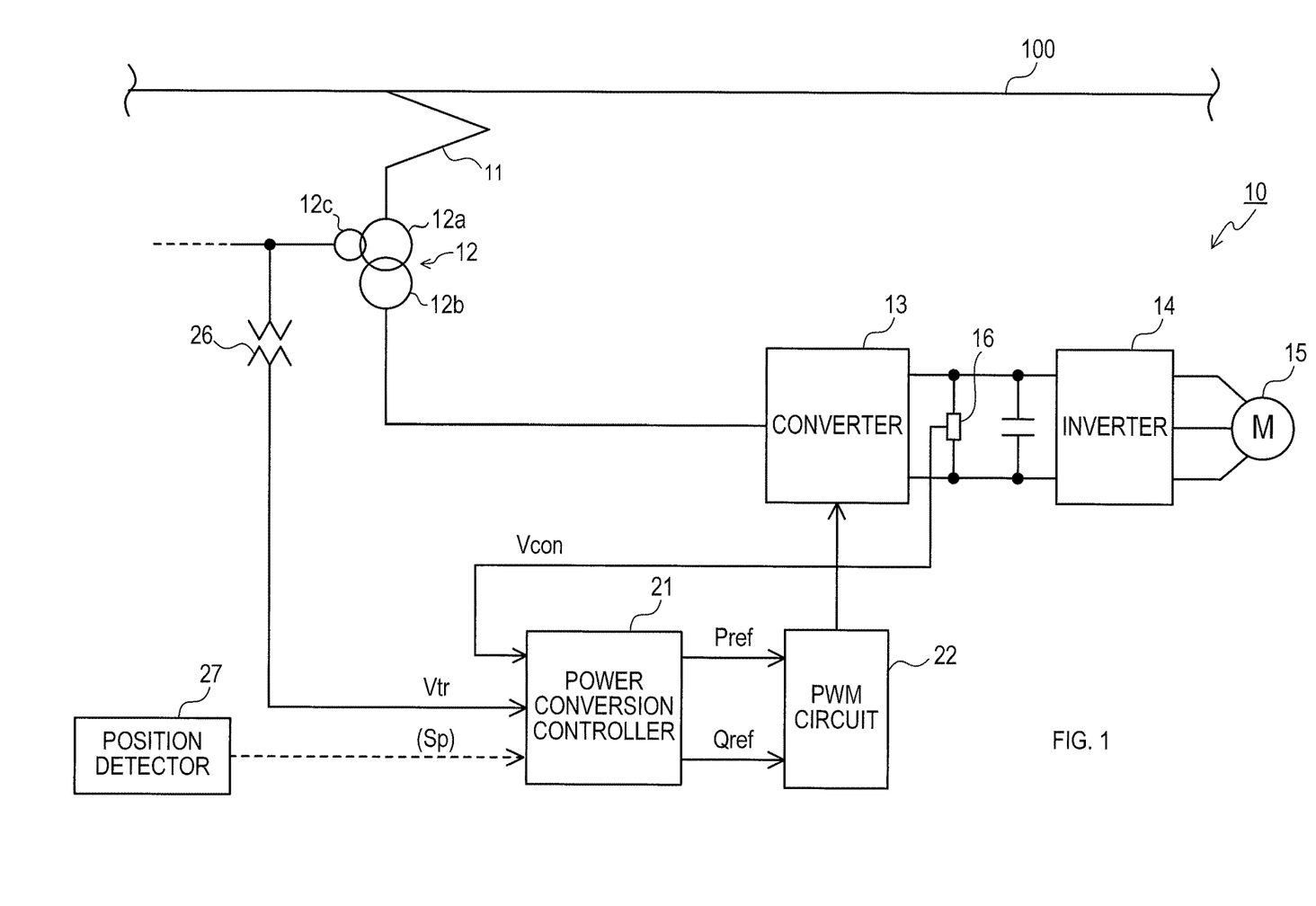
FIG. 1 is an explanatory view showing a schematic configuration of a main circuit system for electric train of an embodiment.

A main circuit system 10 for electric train shown in FIG. 1 is mounted on an electric train configured to collect alternating-current (AC) power from an overhead line 100. The overhead line 100 is coupled to a feeding circuit (not shown) and receives supply of AC power from the feeding circuit.

The main circuit system 10 for electric train, as shown in FIG. 1, includes a pantograph 11, a main transformer 12, a converter 13, an inverter 14, a motor 15, a power conversion controller 21, a PWM circuit 22, an overhead line voltage detector 26, and a position detector 27.

The electric train on which the main circuit system 10 for electric train is mounted may include one vehicle or a plurality of coupled vehicles. In case of the plurality of coupled vehicles, it is not always necessary for all components included in the main circuit system 10 for electric train shown in FIG. 1 to be mounted on the same one vehicle. For example, the power conversion controller 21 may be mounted on a different vehicle from a vehicle on which the pantograph 11 is mounted.

The pantograph 11 is a well-known current collector for collecting AC power from the overhead line 100. The voltage collected from the overhead line 100 is, for example, 25 kV AC in the present embodiment.

The main transformer 12 steps down the AC power collected by the pantograph 11 and supplies the resulting AC power to the converter 13. The main transformer 12 includes a primary winding 12a which receives the AC power from the pantograph 11, a secondary winding 12b which steps down the AC power from the pantograph 11 and outputs the resulting AC power to the converter 13, and a tertiary winding 12c which steps down the AC power from the pantograph 11 and supply the resulting AC power to an auxiliary circuit system (not shown). A voltage value of the AC power outputted from the secondary winding 12b of the main transformer 12 (hereinafter, secondary output power) is, for example, 1000 V AC. A voltage value of the AC power outputted from the tertiary winding 12c of the main transformer 12 (hereinafter, tertiary output power) is, for example, 400 V AC. Of course, these voltage values are merely examples.

The converter 13 converts the secondary output power outputted from the main transformer 12 into direct-current (DC) power, and outputs the resulting DC power. The converter 13 of the present embodiment is a so-called PWM converter. The converter 13 of the present embodiment, for example, converts 1000 V AC of the secondary output power of the main transformer 12 into 2000 V DC and outputs the resulting DC power. These voltage values are also mere examples.

The inverter 14 converts the DC power outputted from the converter 13 into three-phase AC power and outputs the three-phase AC power to the motor 15. The inverter 14 of the present embodiment is a so-called VVVF inverter. The motor 15 is a three-phase induction motor in the present embodiment. The motor receives the three-phase AC power so as to be rotationally driven. When the motor 15 is rotationally driven, its rotational driving force is transmitted to wheels (not shown), thereby causing the electric train to travel.

The overhead line voltage detector 26 is provided to detect a value of an overhead line voltage which is a voltage received from the overhead line 100 by the pantograph 11. The overhead line voltage detector 26 outputs a value corresponding to a voltage value of the tertiary output power outputted from the tertiary winding 12c of the main transformer 12, that is, an overhead line voltage detection value Vtr (hereinafter, detection value Vtr) indicating a magnitude of the overhead line voltage to the power conversion controller 21.

The power conversion controller 21 of the present embodiment uses a pu system for each value used for various calculations described later. Therefore, the overhead line voltage detector 26 is configured to output a normalized value based on a detection value Vtr corresponding to a rated value of the overhead line voltage as the overhead line voltage detection value Vtr, that is, a value of the pu system. The detection value Vtr itself which is outputted from the overhead line voltage detector 26 may not be a value in pu system, but may be converted into a value in pu system in the power conversion controller 21.

The position detector 27 detects a position where the electric train is traveling and outputs to the power conversion controller 21 a position detection signal Sp which indicates the detected position. The position detection signal Sp is not used in the power conversion controller 21 of the present first embodiment, but is used in a second and a fourth embodiments described later.

A converter voltage detector 16 which detects an output voltage from the converter 13 is provided between the converter 13 and the inverter 14. The converter voltage detector 16 outputs to the power conversion controller 21 a converter output voltage detection value Vcon (hereinafter, detection value Vcon) which indicates a value of the output voltage from the converter 13.

The converter voltage detector 16 is configured to output, as the detection value Vcon, a normalized value corresponding to a rated value of the output voltage of the converter, that is, a value in the pu system. Or, the detection value Vcon itself outputted from the converter voltage detector 16 may not be a value in the pu system, but may be converted into a value in the pu system in the power conversion controller 21.

The power conversion controller 21 calculates an active current command value Pref (hereinafter, command value Pref) which indicates an active current to be inputted to the converter 13 (that is, to be consumed in the converter 13), and a reactive current command value Qref (hereinafter, command value Qref) which indicates a leading reactive current to be consumed by the converter 13, using the detection value Vtr detected by the overhead line voltage detector 26 and the detection value Vcon detected by the converter voltage detector 16, and outputs the command values Pref and Qref to the PWM circuit 22.

The PWM circuit 22, based on the command value Pref and the command value Qref inputted from the power conversion controller 21, controls the converter 13 so that the active current corresponding to the command value Pref and the leading reactive current corresponding to the command value Qref are inputted to the converter 13 (that is, so that the active current and the leading reactive current are consumed in the converter 13).

In particular, ON timing and OFF timing of a plurality of switching elements of the converter 13 are individually controlled so that the converter 13 consumes the above active current and the above leading reactive current. The command value Pref is a parameter which determines the active current inputted to the converter 13, that is, a parameter which determines the active power to be consumed by the converter 13. The command value Qref is a parameter which determines the leading reactive current inputted to the converter 13, that is, a parameter that determines the leading reactive current to be consumed by the converter 13.

(2) Configuration of Power Conversion Controller

Figure 2:
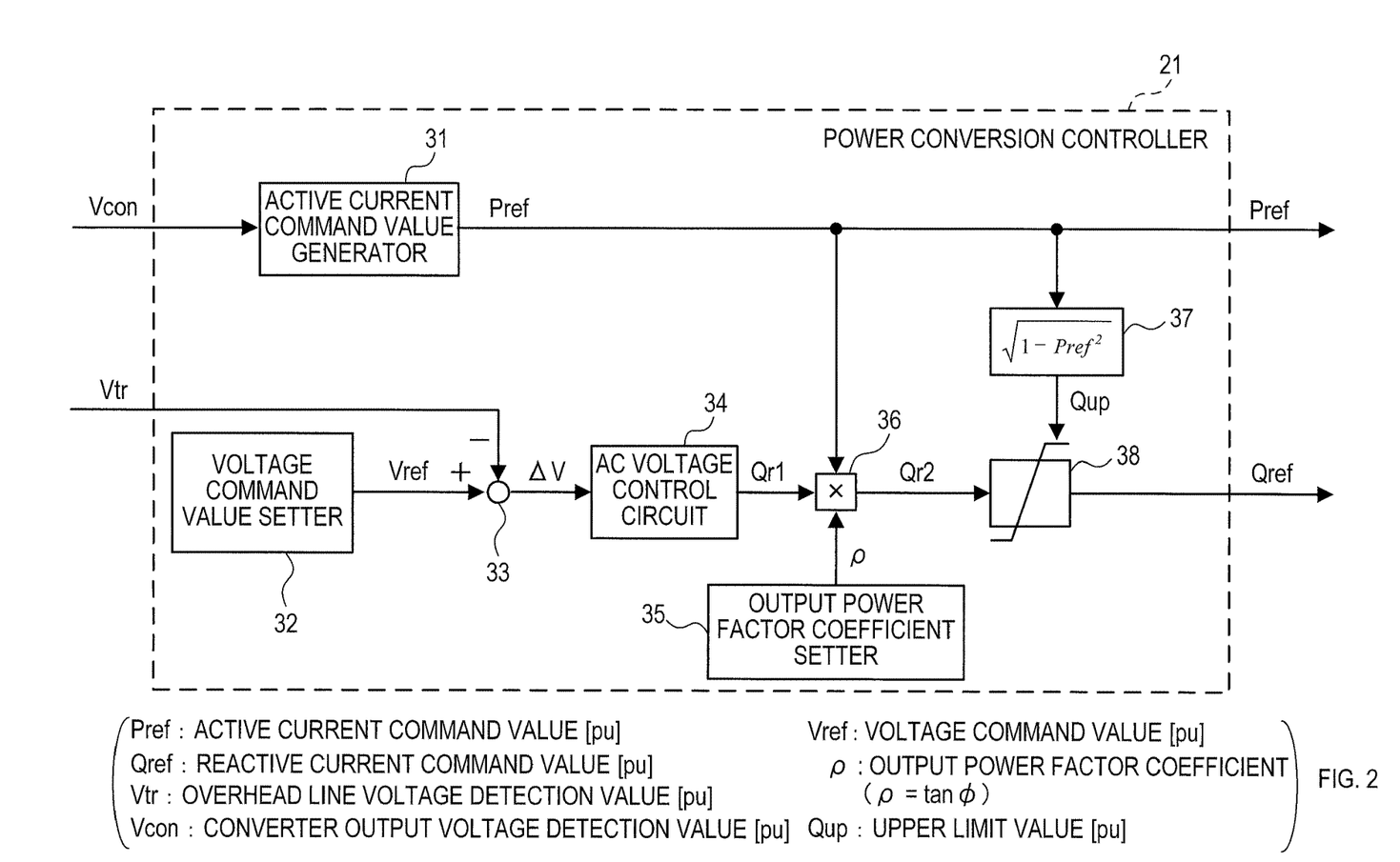
FIG. 2 is a block diagram showing a schematic configuration of a power conversion controller of a first embodiment.

Configuration of the power conversion controller 21 of the present embodiment will be described with reference to FIG. 2. As shown in FIG. 2, the power conversion controller 21 includes an active current command value generator 31, a voltage command value setter 32, an adder 33, an AC voltage control circuit 34, an output power factor coefficient setter 35, a multiplier 36, an upper limit value setter 37, and a limiter circuit 38.

A function to be achieved by the power conversion controller 21 shown in FIG. 2 may be achieved, for example, by a computer executing a specified control program, or part or all of the function may be achieved by a hardware which combines a logic circuit, an analog circuit, and the like.

The active current command value generator 31 generates the command value Pref [pu] corresponding to the active power required by the electric train, that is, the active power to be supplied to a load from the converter 13. The command value Pref [pu] herein is a normalized value based on a rated input current value, which is a rated value of an input current determined in the converter 13.

The load of the converter 13 indicates the entire load which consumes the electric power outputted from the converter 13. Thus, the load of the converter 13 includes at least the inverter 14 and the motor 15.

In the following description, the unit symbol [pu] in the command value Pref [pu] will be omitted. Also, a voltage command value Vref (hereinafter, command value Vref) described later, a voltage difference ΔV described later, a reactive current command initial value Qr1 (hereinafter, initial value Qr1) described later, a reactive current command adjustment value Qr2 (hereinafter, adjustment value Qr2) described later, an upper limit value Qup described later, and the above-described command value Qref are values in the pu system. However, the unit symbol [pu] in these values will be also omitted.

The active current command value generator 31 generates the command value Pref for causing the converter 13 to input the active current required for supplying active power so that the required active power can be supplied to the load.

The active power required by the electric train varies depending on an operating state of the load. The operating state of the load can be indirectly known by a value of the output voltage from the converter 13. When the active power to be supplied to the load increases, the output voltage of the converter 13 decreases. Conversely, the active power to be supplied decreases, the output voltage of the converter 13 increases.

Therefore, in the present embodiment, the active current command value generator 31, based on the detection value Vcon inputted from the converter voltage detector 16, performs a specified voltage constant control for maintaining the output voltage of the converter 13 to a constant rated value, thereby generating the command value Pref. In particular, the active current command value generator 31 generates the command value Pref so that the smaller the detection value Vcon is, the larger the command value Pref is.

In the electric train, as a notch operated by a driver rises, the electric power to be supplied to the motor 15 increases. That is, it can be said that the active power required by the electric train equivalently relies on a state of the notch. Therefore, the active current command value generator 31 may be configured to generate the command value Pref, for example, in accordance with the state of the notch. In particular, the active current command value generator 31 may be configured to generate the command value Pref such that the command value Pref increases as the notch rises.

The voltage command value setter 32 sets the command value Vref [pu] as a target value for the detection value Vtr. What value in particular to be set as the command value Vref may be determined as appropriate. For example, the detection value Vtr when the overhead line voltage is 28 kV may be set as the command value Vref so that the overhead line voltage from the overhead line 100 is maintained to be 28 kV.

The adder 33 calculates the aforementioned voltage difference ΔV which is a difference between the command value Vref set in the voltage command value setter 32 and the detection value Vtr.

The AC voltage control circuit 34 includes, for example, a proportional integration circuit, a primary delay circuit or the like. The AC voltage control circuit 34 calculates the reactive current command value so that the voltage difference ΔV becomes 0, that is, the detection value Vtr follows the command value Vref. The reactive current command value calculated here is not a value finally outputted to the PWM circuit 22, but merely a value calculated in order to make the voltage difference ΔV to be 0. Therefore, the reactive current command value calculated here is referred to as the aforementioned initial value Qr1, so as to be distinguished from a finally calculated command value Qref.

The multiplier 36 multiplies the command value Pref generated in the active current command value generator 31, the initial value Qr1 calculated in the AC voltage control circuit 34, and an output power factor coefficient ρ (hereinafter, coefficient ρ) set in the output power factor coefficient setter 35. This multiplication calculates the aforementioned adjustment value Qr2 which is a value obtained by adjusting the initial value Qr1 by the command value Pref and the coefficient ρ.

In the multiplication by the multiplier 36, multiplication of the initial value Qr1 and the command value Pref is for adjusting the initial value Qr1 calculated in the AC voltage control circuit 34 to a value of a percentage corresponding to the command value Pref. For example, when the command value Pref is 0.8 [pu], the initial value Qr1 is adjusted to a value of 80% by the multiplication with the command value Pref.

In the multiplication by the multiplier 36, multiplication of the initial value Qr1 and the coefficient ρ is for adjusting the initial value Qr1 calculated in the AC voltage control circuit 34 in accordance with an output power factor setting value cos φ (hereinafter, setting value cos φ), that is, for adjusting the initial value Qr1 so that the electric power having a power factor equal to or larger than the setting value cos φ is inputted to the converter 13 and consumed in the converter 13. The φ is a power factor angle and is preset in accordance with the active power to be consumed in the converter 13, which setting can be changed as appropriate.

The coefficient ρ is defined, using the power factor angle φ, as ρ=tan φ, that is, a tangent of the power factor angle φ. That is, as the power factor angle φ decreases and the setting value cos φ approaches to 1, the coefficient ρ decreases. Conversely, as the power factor angle φ increases and the setting value cos φ approaches to 0, the coefficient ρ increases.

Therefore, multiplication in the multiplier 36 of the initial value Qr1 and the coefficient ρ adjusts the initial value Qr1 to a smaller value as the setting value cos φ approaches to 1. Conversely, as the setting value cos φ approaches to 0, the initial value Qr1 is adjusted to a larger value.

Use of tan φ as the coefficient ρ is merely an example. In accordance with the setting value cos φ, another value which can appropriately adjust the initial value Qr1 may be used as the coefficient ρ. That is, the coefficient ρ may be set between 0 to 1 in accordance with the setting value cos φ.

The main purpose of adjusting the initial value Qr1 with the command value Pref by the multiplication by the multiplier 36 is to adjust an amount of the leading reactive current to be consumed in the converter 13 to an appropriate amount corresponding to the magnitude of the active power truly required by a subject train. As a result of this adjustment, if the required active power is large, the leading reactive current is also adjusted to a large value, and, if the required active power is small, the leading reactive current is adjusted to a small value. This can appropriately adjust the leading reactive current per electric train, when, for example, a plurality of electric trains including the subject train are in the same feeding section and each train is provided with the power conversion controller 21 of the present embodiment, resulting in that contention of consumption of the leading reactive current among the plurality of electric trains can be suppressed and the overhead line voltage can be stabilized.

On the other hand, the main purpose of adjusting the initial value Qr1 with the coefficient ρ by multiplication performed by the multiplier 36 is to merely give priority to consumption of the active power in the converter 13, in more particular, not to unnecessarily increase consumption current of the converter 13 even if the overhead line voltage decreases and the active current inputted to the converter 13 decreases. In order to ensure the power factor equal to or larger than the setting value cos φ regardless of the value of the active current, the adjustment using the coefficient ρ is performed.

The limiter circuit 38 limits the maximum value of the adjustment value Qr2 calculated in the multiplier 36 and outputs the limited value as the final command value Qref. In particular, when the adjustment value Qr2 is equal to or lower than the upper limit value Qup, the adjustment value Qr2 is outputted as the command value Qref. If the adjustment value Qr2 exceeds the upper limit value Qup, the upper limit value Qup is outputted as the command value Qref.

The upper limit value Qup is set by the upper limit value setter 37. The upper limit value setter 37, based on the command value Pref, sets the upper limit value Qup to be smaller as the command value Pref is larger. In more particular, the upper limit value setter 37 calculates and sets the upper limit value Qup by an equation (1) below.

$$Qup = \sqrt{(1 - Pref2)} \quad (1)$$

That is, priority is given to full consumption in the converter 13 of the command value Pref generated in the active current command value generator 31, so as not to sacrifice consumption of the active power. On the other hand, the entire electric current inputted to the converter 13 is made to be equal to or lower than the rated input current value. That is, the upper limit value Qup for the command value Qref is set so that a combined value of the command value Pref and the command value Qref (that is, vector composite value) is equal to or lower than the rated input current value. Therefore, the leading reactive current is limited within a range of surplus power, excluding the command value Pref, of the rated input current of the converter 13.

Operation of the limiter circuit 38 based on the upper limit value Qup can limit the entire electric current inputted to the converter 13 to the rated input current value or less. The active current is preferentially consumed within the range of the rated input current value or less, and the leading reactive current is applied to a portion of surplus power.

(3) Effect of First Embodiment

According to the above-described first embodiment, effect as below can be achieved.

In the power conversion controller 21 of the first embodiment, the command value Pref generated in the active current command value generator 31 is outputted without any specific limitation.

On the other hand, with respect to the command value Qref, the initial value Qr1 calculated in the AC voltage control circuit 34 is appropriately adjusted or limited and then is outputted. In particular, the initial value Qr1 calculated in the AC voltage control circuit 34 is adjusted to a value corresponding to the command value Pref by the multiplier 36 as well as to a value corresponding to the power factor angle φ. In particular, as the command value Pref is smaller, the initial value Qr1 is adjusted to a smaller value. Also, as the power factor angle φ is smaller (that is, as the setting value cos φ is closer to 1) the initial value Qr1 is adjusted to a smaller value.

Adjustment of the initial value Qr1 to a value corresponding to the command value Pref can suppress contention of consumption of the leading reactive current with other electric trains in the same feeding circuit, and stably maintain the overhead line voltage received from the overhead line 100 to a value equal to or more than the standard value (rated value). Therefore, decrease of the overhead line voltage along with traveling of the electric train can be suppressed, resulting in extension of a feeding distance, and omission of installation of a var compensator, a fixed power factor output power converter or the like in a feeding substation. The total cost for installation for running the electric train can be reduced.

In addition, adjustment of the initial value Qr1 to a value corresponding to the setting value cos φ makes it possible to control the active power to be dominant in the electric power consumed in the converter 13 regardless of the magnitude of the command value Pref.

Also, the adjustment value Qr2 adjusted by the command value Pref and the setting value cos φ in the multiplier 36 is further outputted as the command value Qref via the limiter circuit 38. Thereby, the finally outputted command value Qref is limited to the upper limit value Qup at maximum.

Moreover, the upper limit value Qup is calculated by the above-described equation (1). Therefore, the control is achieved which gives priority to consumption of the active power within the range of the rated input current value of the converter 13. As a result, while a rated capacity of the converter 13 is maintained equivalent to a conventional converter which only consumes the active power (that is, controlled at the unity power factor), the overhead line voltage can be stably maintained at an appropriate level as well as the active power required for the electric train is ensured.

Supplemental description on the effect of the first embodiment will be given. One of the main features of the power conversion controller 21 of the first embodiment is that the control prioritizes consumption of the active power so that specified propulsive force is obtained without increasing the rated capacity of the converter 13. Also, another one of the main features is that, although a plurality of electric trains are in the same feeding circuit, each electric train autonomously determines the share of consumption of the leading reactive power, and the overhead line voltage can be stably controlled.

An alternative technique to the control prioritizing active power consumption is, for example, a technique to increase the rated capacity of the converter 13 so as to ensure in advance a capacity for consumption of the leading reactive power. However, adoption of such a technique increases the weight of the converter 13 and makes it difficult to ensure the installation space, and thus implementation is difficult. Even if implementation is made, increase in power consumption of the electric train due to increase in weight may occur.

Also, an alternative technique for the method of determining the share of consumption of the leading reactive power in a plurality of electric trains in the same feeding circuit may be, for example, a method of measuring power consumption of each electric train, transmitting the result of measurement to one control station, determining the share of consumption of the leading reactive power by each electric train at the control station, and sending instructions to each electric train from the control station. However, such a technique requires a transmission means between the control station and each electric train, and it is highly probable that control of voltage becomes unstable due to transmission delay. Therefore, implementation thereof is considered difficult in terms of cost and voltage control stability In view of the above, in order to make the converter 13 consume the leading reactive power and stably control the overhead line voltage without impairing the propulsive force required for the electric train, the control method described in the first embodiment is very effective. Adoption of the control method described in the first embodiment can give priority to active power consumption while stabilizing the overhead line voltage, thereby reducing current consumption of the electric train. As a result, reduction of weight and size of the main transformer 12, reduction of power loss in the entire feeding system, and energy saving of the electric train can be achieved.

The converter 13 corresponds to an example of a power converter of the present disclosure, the power conversion controller 21 corresponds to an example of a power conversion controller for electric train of the present disclosure. The AC voltage control circuit 34 corresponds to an example of an initial value calculator of the present disclosure. The multiplier 36 corresponds to an example of an adjustment value calculator of the present disclosure. The limiter circuit 38 corresponds to an example of an output limiter of the present disclosure.

[Second Embodiment]

Basic configuration of a second embodiment is the same as that of the first embodiment. Therefore, description of common components to those of the first embodiment will not be given, and the difference will be mainly described. The same reference numerals as those of the first embodiment denote the same components and reference is made to the preceding description.

Figure 3:
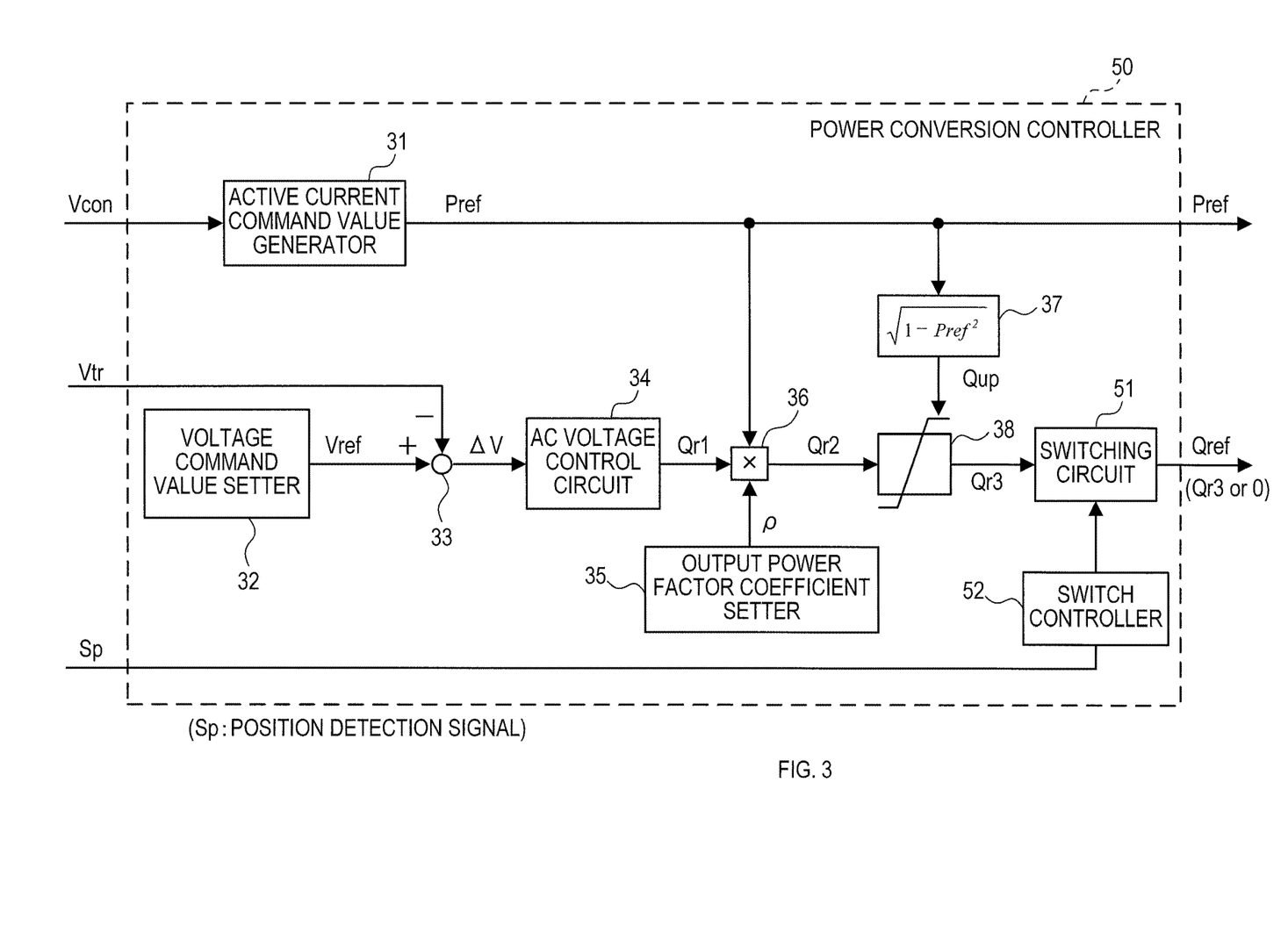
FIG. 3 is a block diagram showing a schematic configuration of a power conversion controller of a second embodiment.

A power conversion controller 50 of the second embodiment shown in FIG. 3 further includes a switching circuit 51 and a switch controller 52, as compared to the power conversion controller 21 of the first embodiment shown in FIG. 2.

The switching circuit 51 is a circuit to switch whether to output a value outputted from the limiter circuit 38 without change, or to output 0, as the command value Qref. Hereinafter, the value outputted from the limiter circuit 38 is also referred to as a limiter output value Qr3.

The switching circuit 51 switches the command value Qref to be outputted either to the limiter output value Qr3 from the limiter circuit 38 or to 0 in accordance with a switching command from the switch controller 52.

The switch controller 52 controls the switching circuit 51, based on the position detection signal Sp inputted from the position detector 27, for example. The switch controller 52 is configured to determine whether to set the command value Qref to 0 in accordance with a traveling position of the subject train to control the switching circuit 51.

The switch controller 52 makes the switching circuit 51 output 0 as the command value Qref, when the subject train is currently in position where the command value Qref should be 0(that is, where the leading reactive current should not be consumed), based on the input position detection signal Sp. On the other hand, the switch controller 52 makes the switching circuit 51 output the limiter output value Qr3 as the command value Qref, when the subject train is not currently in position where the command value Qref should be 0 (that is, where the leading reactive current should not be consumed), based on the input position detection signal Sp.

The following can be said as a background for adopting the technique of setting the command value Qref to 0 in accordance with the position of the subject train. That is, fluctuation and decrease in the overhead line voltage does not always occur during traveling of the electric train. There are cases in which the overhead line voltage is sufficiently appropriate depending on the traveling position and other conditions. In those cases, even the electric train may be driven at the unity power factor without consuming the leading reactive current.

Also, information on around which position during the traveling the overhead line voltage tends to decrease, and conversely around which position the overhead line voltage is stable, can be known to a certain extent in advance. For example, when power supply capacity itself on the power supply side of the feeding circuit is low, the overhead line voltage over the entire traveling section which receives power supply from the feeding circuit tends to decrease. Therefore, it is considered preferable to consume the leading reactive current. In addition, the longer the distance of the feeding circuit from a power source is, the larger the loss is. The overhead line voltage inputted to the electric train may decrease. In that case as well, it is considered preferable to consume the leading reactive current. Also, for example, when the subject train is in the feeding section where a var compensator is installed in the feeding substation and sufficient overhead line voltage is ensured, necessity of consuming the leading reactive power at the electric train side is low. It is rather preferable to set the command value Qref to 0.

Therefore, in the present second embodiment, when the subject train is in position where the overhead line voltage tends to decrease, the limiter output value Qr3 is outputted as the command value Qref corresponding to the position of the subject train. When the subject train is in position where the overhead line voltage is unlikely to decrease and necessity to consume the leading reactive current is low, 0 is outputted as the command value Qref.

The position detection signal Sp may be a signal including information indicating merely the position of the subject train. Alternatively, the position detection signal Sp may be a signal including information indicating whether the position of the subject train is the position where 0should be outputted as the command value Qref. When the position detection signal Sp itself includes the information indicating which of the limiter output value Qr3 and 0 should be outputted as the command value Qref, the switch controller 52 may be omitted and the position detection signal Sp may be inputted to the switching circuit 51 which may be configured to output the limiter output value Qr or 0 based on the position detection signal Sp.

According to the power conversion controller 50 of the second embodiment configured as above, the following effect, in addition to the effect of the first embodiment, can be obtained. That is, depending on whether there is necessity for the converter 13 to consume the leading reactive power, the command value Qref is switched between the limiter output value Qr3 or 0. Therefore, consumption of the leading reactive current can be appropriately controlled in accordance with the conditions. Especially, in the present second embodiment, when the subject train is in position to consume the leading reactive current, the leading reactive current is consumed corresponding to the position of the subject train. When the subject vehicle is in position where there is no necessity to consume the leading reactive current or such necessity is low, the leading reactive current can be 0. Therefore, the leading reactive power can be appropriately controlled in accordance with the position of the subject train.

The switching circuit 51 and the switch controller 52 correspond to an example of an output switcher (especially, first output switcher) of the present disclosure. The position detection signal Sp corresponds to an example of the switching information of the present disclosure.

[Third Embodiment]

Basic configuration of a third embodiment is the same as that of the first embodiment. Therefore, description on common components to those of the first embodiment will not be given, and the difference will be mainly described. The same reference numerals as those of the first embodiment denote the same components and reference is made to the preceding description.

Figure 4:
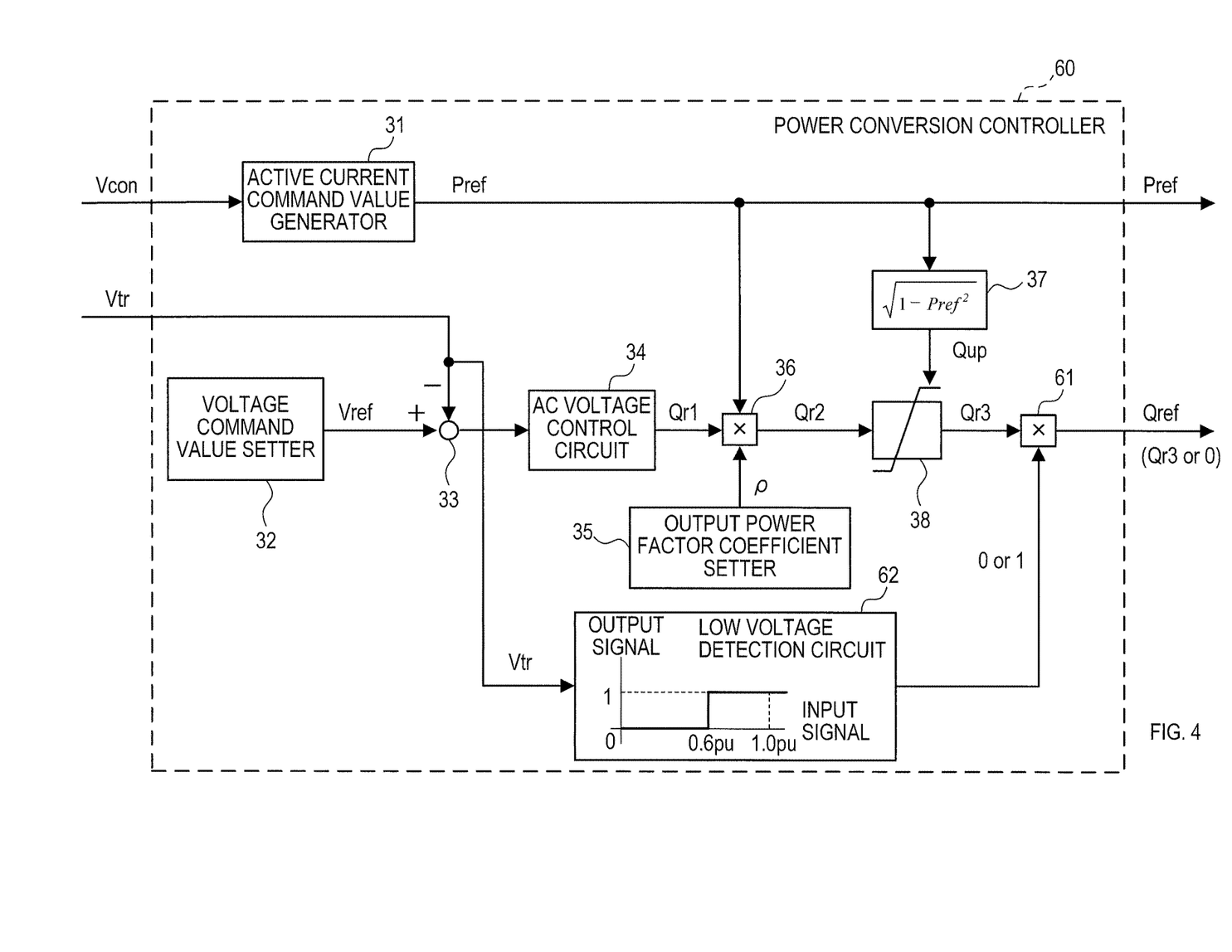
FIG. 4 is a block diagram showing a schematic configuration of a power conversion controller of a third embodiment.

A power conversion controller 60 of the third embodiment shown in FIG. 4 further includes an output multiplier 61 and a low voltage detection circuit 62, with respect to the power conversion controller 21 of the first embodiment shown in FIG. 2. The output multiplier 61 and the low voltage detection circuit 62 are provided to forcibly set the command value Qref to 0 when the overhead line voltage becomes improper low voltage state.

That is, in the feeding circuit where the subject train is in position, when, for example, a ground fault or a short circuit fault occurs and the feeding circuit is in power failure state, there is no necessity to control the leading reactive current to be aggressively consumed in the subject train. Rather, such a control should be stopped. In the present embodiment, the overhead line voltage is monitored, and, when a low voltage which does not occur during normal operation is detected, the command value Qref is forcibly set to 0, so that unnecessary consumption of the leading reactive current is suppressed at the time of power failure in the feeding circuit.

The low voltage detection circuit 62 outputs a signal of 1 or 0 to the output multiplier 61 in accordance with the detection value Vtr. The low voltage detection circuit 62 is provided to detect that the value of the overhead line voltage is outside a proper range and is a low value. In particular, a threshold value is set for the detection value Vtr. The low voltage detection circuit 62 outputs 1 when the detection value Vtr is equal to or more than the threshold value, and outputs 0 when the detection value Vtr is less than the threshold value. What value should be the threshold value may be determined as appropriate in accordance with the rated value of the overhead line voltage, the proper range, the range to be determined improper and the like. In the present embodiment, the threshold value is set to 0.6 [pu] as an example. That is, the low voltage detection circuit 62 is configured to output 0 when the overhead line voltage is less than 16.8 kV which is 0.6 times the rated value (e.g., 28 kV).

The output multiplier 61 multiplies the limiter output value Qr3 outputted from the limiter circuit 38 and 1 or 0 outputted from the low voltage detection circuit 62, and outputs a result of the multiplication as the command value Qref. When 1 is inputted from the low voltage detection circuit 62, that is, when the detection value Vtr is equal to or more than 0.6 [pu] and the overhead line voltage is in the proper range, the limiter output value Qr3 is outputted as the command value Qref. On the other hand, when 0 is inputted from the low voltage detection circuit 62, that is, when the detection value Vtr is less than 0.6 [pu] and the overhead line voltage is in improper low voltage state, the command value Qref is forcibly set to 0.

According to the power conversion controller 60 of the third embodiment configured as above, in addition to the effect of the first embodiment, the following effect can be obtained. That is, when the overhead line voltage is improperly low, the command value Qref is forcibly set to 0. Therefore, unnecessary consumption of the leading reactive current can be suppressed at the time of power failure of the feeding circuit.

The low voltage detection circuit 62 corresponds to an example of an overhead line voltage determiner of the present disclosure. The output multiplier 61 corresponds to an example of an output switcher (especially, second output switcher) of the present disclosure.

[Fourth Embodiment]

Figure 5:
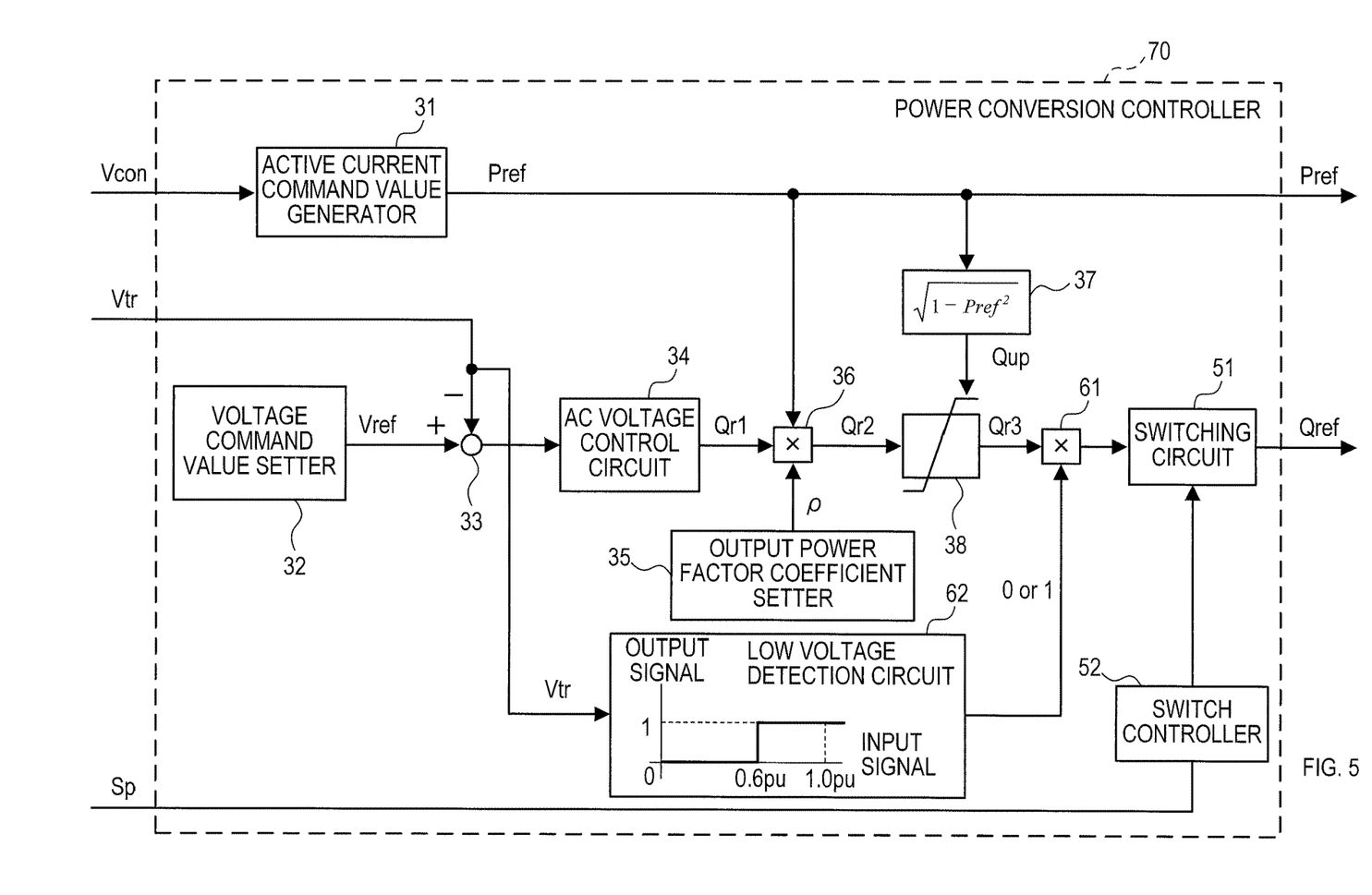
FIG. 5 is a block diagram showing a schematic configuration of a power conversion controller of a fourth embodiment.

In a power conversion controller 70 of the present fourth embodiment shown in FIG. 5, the configuration of the power conversion controller 50 of the second embodiment shown in FIG. 3 and the configuration of the power conversion controller 60 of the third embodiment shown in FIG. 4 are combined. That is, the power conversion controller 50 of the second embodiment shown in FIG. 3 is further provided with the output multiplier 61 and the low voltage detection circuit 62 in the power conversion controller 60 of the third embodiment shown in FIG. 4.

As shown in FIG. 5, the output multiplier 61 is provided downstream of the limiter circuit 38. The switching circuit 51 is provided downstream of the output multiplier 61. The position of the output multiplier 61 and the switching circuit 51 may be switched. According to the power conversion controller 70 of the fourth embodiment as above, both the effect of the second embodiment and the effect of the third embodiment can be obtained.

[Other Embodiments]

The embodiments for carrying out the present disclosure have been described in the above. However, the present disclosure is not limited to the above-described embodiments, and various modifications can be made.

(1) A control object of the present disclosure is not limited to the converter 13 of the above-described embodiments. The present disclosure can be applied to any power conversion controller which controls various power converters configured to convert AC power inputted from an overhead line which receives supply of AC power.

Detail of power conversion in a power converter to be controlled is also not particularly limited. The power conversion is not limited to conversion of AC power into DC power as the above-described converter 13. Inputted AC power may be converted into another form of AC power (for example, AC power having a different frequency or voltage).

In addition, it is merely an example that the power converter is configured to be PWM driven. The present disclosure can be applied to a power conversion controller for controlling any power converter which can be operated in accordance with the command value Pref and the command value Qref.

(2) In the second embodiment, the switching circuit 51 may be configured so that switching operation can be made based on other information different from the position of the subject train. For example, the switching circuit 51 may be directly or indirectly operable by a train driver at discretion of the driver. More particularly, a switch for operating the switching circuit 51 may be provided near the driver's seat. The switching circuit 51 may be operable in accordance with the details of operation of the switch made by the driver.

In addition, the switching circuit 51 may be configured to switch the command value Qref to 0 based on the overhead line voltage when the overhead line voltage is sufficiently maintained. For example, the switching circuit 51 may be configured to output 0 as the command value Qref when the overhead line voltage is equal to or more than the rated value, or a value higher than the rated value by a specified amount.

(3) In the above-described embodiments, it is described that the upper limit value setter 37 calculates the upper limit value Qup using the above-described equation (1). However, the upper limit value Qup may be calculated by another method. That is, as long as the active current corresponding to the command value Pref is ensured, to what extent at maximum in particular the leading reactive current is limited can be determined as appropriate. For example, the leading reactive current may be limited as appropriate by further multiplying the above-described equation (1) by a specified coefficient less than 1.

(4) In the above-described embodiments, the normalized values (that is, values in the pu system) corresponding to reference values are used to perform various control operations. However, it is not essential to perform control operation on values in the pu system as such.

(5) A function of a single component in the above-described embodiments may be divided into a plurality of components, or functions of a plurality of components may be integrated into a single component. Also, at least part of the configuration of any of the above-described embodiments may be replaced with a known configuration having the same function. Some of the configurations of any of the above-described embodiments may be omitted. Further, at least part of the configuration of any of the above-described embodiments may be added or substituted to the configuration of another embodiment. Any aspects included in the technical idea specified only by the language as set forth in the appended claims are embodiments of the present disclosure.

(6) In addition to the above-described power conversion controller, the present disclosure can be implemented in various forms, such as a system including the power conversion controller as a component, a program for causing a computer function as the power conversion controller, a medium on which the program is recorded, a control method used in the power conversion controller and the like.

What is claimed is:

1. A power conversion controller for electric train, and an overhead line voltage detector configured to detect an overhead line voltage which is a voltage received from the overhead line, the power conversion controller is to be mounted on an electric train, the electric train being configured to receive AC power from an overhead line through which the AC power is supplied, the power conversion controller for electric train being configured to control a power converter that converts the AC power inputted from the overhead line, the power converter being configured to receive an active current command value and a reactive current command value from the power conversion controller for electric train, and to consume an active current corresponding to the active current command value and a leading reactive current corresponding to the reactive current command value, the power conversion controller for electric train comprising:
an active current command value generator configured to generate the active current command value corresponding to active power to be supplied to a load from the power converter;
an initial value calculator configured to calculate a reactive current command initial value which is an initial value of the reactive current command value for causing an overhead line voltage detection value to follow a voltage command value, based on a difference between the voltage command value and the overhead line voltage detection value, the voltage command value being a target value of the overhead line voltage, and the overhead line voltage detection value being the overhead line voltage detected by the overhead line voltage detector;
an adjustment value calculator configured to calculate a reactive current command adjustment value that is a value of a percentage of the reactive current command initial value calculated by the initial value calculator, the percentage corresponding to the active current command value generated by the active current command value generator;
an upper limit value setter configured to set an upper limit value of the reactive current command value based on the active current command value generated by the active current command value generator so that the larger the active current command value is, the smaller the upper limit value of the reactive current command value is; and
an output limiter configured to output the reactive current command adjustment value as the reactive current command value when the reactive current command adjustment value calculated by the adjustment value calculator is equal to or lower than the upper limit value set by the upper limit value setter, and to output the upper limit value as the reactive current command value when the reactive current command adjustment value exceeds the upper limit value.

2. The power conversion controller for electric train, and the overhead line voltage detector according to claim 1, wherein
the upper limit value setter is configured to set the upper limit value for the reactive current command value so that a combined value of the active current command value generated by the active current command value generator and the reactive current command value is equal to or smaller than a rated input current value which is a rated value of an input current of the power converter.

3. The power conversion controller for electric train, and the overhead line voltage detector according to claim 1, wherein
the adjustment value calculator is configured to calculate the reactive current command adjustment value corresponding to a value of a percentage of the reactive current command initial value calculated by the initial value calculator, the percentage corresponding to the active current command value generated by the active current command value generator, based on an output power factor setting value specified in advance for a power factor of electric power to be consumed by the power converter, such that the larger the output power factor setting value is, the smaller the reactive current command adjustment value is, in order for electric power having a power factor equal to or larger than the output power factor setting value to be inputted to the power converter.

4. The power conversion controller for electric train, and the overhead line voltage detector according to claim 3, wherein the active current command value generator is configured to generate the active current command value as a normalized value corresponding to a rated input current value which is a rated value of an input current of the power converter, the initial value calculator is configured to generate the reactive current command initial value as the normalized value corresponding to the rated input current value, and the adjustment value calculator is configured to multiply the reactive current command initial value calculated by the initial value calculator, the active current command value generated by the active current command value generator, and an output power factor coefficient determined by the output power factor setting value, so as to calculate the reactive current command adjustment value.

5. The power conversion controller for electric train, and the overhead line voltage detector according to claim 4, wherein the output power factor coefficient is a tangent of a power factor angle corresponding to the power factor.

6. The power conversion controller for electric train, and the overhead line voltage detector according to claim 1, further comprising:

an output switcher configured to switch the reactive current command value outputted from the power conversion controller for electric train to one of the reactive current command value from the output limiter and 0.

7. The power conversion controller for electric train, and the overhead line voltage detector according to claim 6, wherein the output switcher is configured to receive switching information which directly or indirectly indicates which of the reactive current command value from the output limiter and 0 to be outputted as the reactive current command value outputted from the power conversion controller for electric train, and to perform the switching based on the switching information received.

8. The power conversion controller for electric train, and the overhead line voltage detector according to claim 7, wherein the output switcher is configured to receive, as the switching information, information indicating a position where the electric train is traveling, or information indicating whether the position is a position to output 0 as the reactive current command value.

9. The power conversion controller for electric train, and the overhead line voltage detector according to claim 6, further comprising:

an overhead line voltage determiner configured to determine whether the overhead line voltage detection value detected by the overhead line voltage detector is equal to or lower than a specified threshold value, wherein the output switcher is configured to receive information indicating a result of the determination by the overhead line voltage determiner, as the switching information, and to output 0 as the reactive current command value when it is determined by the overhead line voltage determiner that the overhead line voltage detection value is equal to or lower than the threshold value.

10. The power conversion controller for electric train, and the overhead line voltage detector according to claim 6, further comprising:

an overhead line voltage determiner configured to determine whether the overhead line voltage detection value detected by the overhead line voltage detector is equal to or lower than a specified threshold value; and a second output switcher provided separately from the output switcher which is a first output switcher, the second output switcher being configured to output 0 as the reactive current command value, regardless of the reactive current command value from the output limiter, when it is determined by the overhead line voltage determiner that the overhead line voltage detection value is equal to or lower than the threshold value.

\* \* \* \* \*